(12) United States Patent
Marchini et al.

(10) Patent No.: US 6,368,010 B1
(45) Date of Patent: Apr. 9, 2002

(54) FASTENING ASSEMBLIES

(75) Inventors: Barry Allen Marchini, West Sussex; Andrew Thomas Black, Surrey, both of (GB)

(73) Assignee: Starpoint Electrics Limited, Morden (GB)

( * ) Notice: Subject to any disclaimer, the term of this patent is extended or adjusted under 35 U.S.C. 154(b) by 0 days.

(21) Appl. No.: 09/297,983

(22) PCT Filed: Dec. 2, 1997

(86) PCT No.: PCT/GB97/03322

§ 371 Date: May 10, 1999

§ 102(e) Date: May 10, 1999

(87) PCT Pub. No.: WO98/25033

PCT Pub. Date: Jun. 11, 1998

(30) Foreign Application Priority Data

Dec. 2, 1996 (GB) ............................................. 9625050

(51) Int. Cl.⁷ .......................... B25G 3/16; B65D 41/06; B65D 41/36; B65D 39/02
(52) U.S. Cl. ...................... 403/348; 403/349; 403/350; 220/787; 220/3.5; 220/296; 215/363
(58) Field of Search ................................. 403/348, 350, 403/375, 319, 105; 411/552, 553, 550, 535, 536; 24/590.1, 591, 663; 220/786, 787, 788, 3.8, 241; 215/363

(56) References Cited

U.S. PATENT DOCUMENTS

| 757,712 | A | * | 4/1904 | Arnold | 403/348 |
| 850,410 | A | * | 4/1907 | Weatherhead | 403/348 |
| 4,245,753 | A | * | 1/1981 | Ellis | 220/787 |
| 4,334,630 | A | * | 6/1982 | Bergin | 220/787 |
| 4,488,701 | A | | 12/1984 | Leigh-Monstevens | 248/637 |
| 4,532,672 | A | * | 8/1985 | Anderson | 403/349 X |
| 4,622,123 | A | | 11/1986 | Nejame, Jr. | 204/299 R |
| 4,632,195 | A | * | 12/1986 | Emmerich | 403/348 X |
| 4,640,639 | A | * | 2/1987 | Matsui | 403/348 X |
| 4,664,252 | A | * | 5/1987 | Galbraith | 403/348 X |
| 4,669,907 | A | * | 6/1987 | Patton | 403/348 X |
| 4,883,194 | A | * | 11/1989 | Fernandes | 220/787 |
| 5,018,901 | A | * | 5/1991 | Ferree et al. | 403/353 X |
| 5,577,858 | A | * | 11/1996 | Kasim et al. | 403/348 X |
| 5,699,438 | A | * | 12/1997 | Smith et al. | 403/348 X |
| 5,875,500 | A | * | 3/1999 | Shaanan et al. | 403/348 X |
| 5,913,605 | A | * | 6/1999 | Jusselin et al. | 403/348 X |

FOREIGN PATENT DOCUMENTS

| DE | 839 888 | | 5/1952 |
| DE | 3148043 A1 | * | 6/1983 |
| EP | 0 568 921 A1 | | 11/1993 |
| FR | 2289794 A | * | 5/1976 |
| GB | 2 271 216 A | | 4/1994 |
| WO | WO 97/23934 | | 7/1997 |

* cited by examiner

Primary Examiner—Lynne H. Browne
Assistant Examiner—Ernesto Garcia
(74) Attorney, Agent, or Firm—Sughrue Mion, PLLC

(57) ABSTRACT

A fastening assembly is constituted by a plate-like member provided with a plurality of laterally extending projections which can be pushed into position between and then turned into engagement with respective slots formed in protrusions. In one aspect, at least one of the projections and/or at least one of the slots is adapted to give a wedging effect. In another aspect, the protrusions are located around an inner periphery of otherwise circular outline presented by a hollow member, and the projections are formed as arcuate sectors located around the plate-like member which presents an outer periphery of circular outline other than at recesses for receiving the respective protrusions.

8 Claims, 1 Drawing Sheet

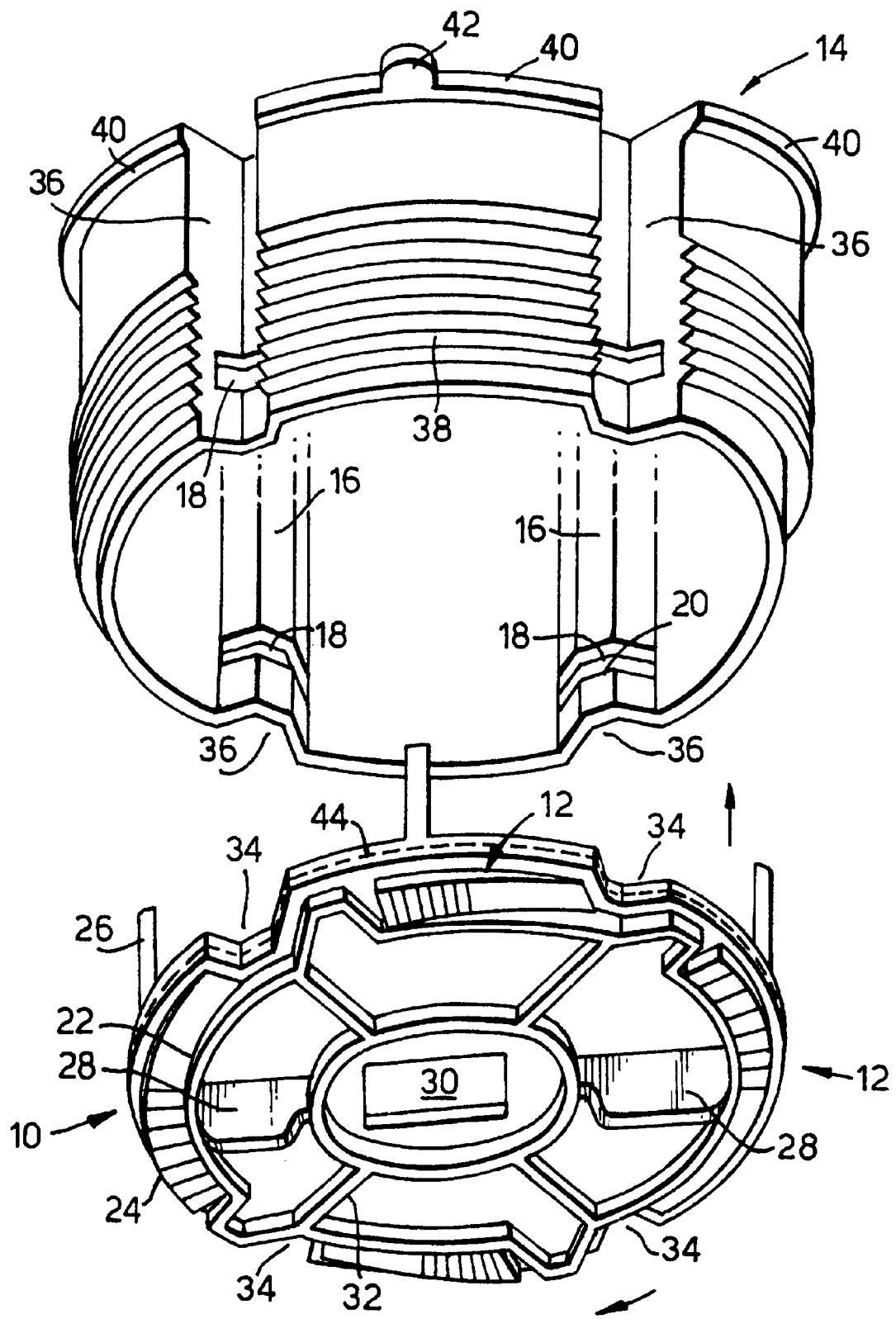

FASTENING ASSEMBLIES

BACKGROUND OF THE INVENTION

There are many fastening assemblies in which parts are fastened together as an assembly by effecting a simple push-and-turn action of the parts relatively to one another.

An example is a standard bayonet connection.

Another example is given in our GB 2271216 where a connection, hereinafter described as being of the kind defined, includes a first part provided with a plurality of laterally extending projections which can be pushed into position between and then turned into engagement with respective slots formed in several other parts.

SUMMARY OF THE INVENTION

An object of the present invention is to improve security in the sense of improving resistance to accidental or unauthorised release.

According to one aspect of the present invention, a fastening assembly comprises a connection of the kind defined characterised in that at least one of the projections and/or at least one of the slots is adapted to give a wedging effect.

According to another aspect of the present invention, a fastening assembly comprises a connection of the kind defined characterised in that the slots are formed in protrusions located around an inner periphery of otherwise circular outline presented by a hollow member, and the projections are formed as arcuate sectors located around a plate-like member presenting an outer periphery of circular outline other than at recesses for receiving the respective protrusions.

It should be understood that references to slots incorporate references to grooves.

It should also be understood that a fastening assembly may incorporate both aspects of the present invention.

However, with particular regard to the aspect of the present invention involving the wedging effect, it is preferred that the wedging effect results from the slot/projection interengagement being non-planar rather than eccentric and, in particular, each of the projections may be formed as a ramp of increasing thickness with increasing turn into the slots.

One or more of the ramps may be of a ratchet-like construction, to further improve the resistance to release by co-operating with a locking rib presented by an associated one or more of the slots, and the ratchet-like construction may result from the formation of teeth. Alternatively, at least one of the slots may present a locking rib for sequential engagement with a series of locking ribs presented by at least one of the ramps, which may be an otherwise smoothly inclined ramp.

Preferably, each of the projections extends laterally outwardly and said other parts are formed integrally with one another.

Moreover, with particular regard to the aspect of the present invention involving the hollow member with inner protrusions and the plate-like member with outer recesses, it is preferred that at least one of the protrusions is hollow, opens to an outer periphery of the hollow member and extends axially of the hollow member.

The rest of the outer periphery of the hollow member between the protrusions may be threaded or ribbed as appropriate to permit engagement thereof by a standard nut or a nut-like member based on those disclosed in our WO 97/23934.

The plate-like member may also include, for example, a plurality of legs extending perpendicularly in a first direction to act as abutments. The legs may act as abutments for a component, such as a push button, carried by the plate-like member. Moreover, a pair of wings may extend perpendicularly in a second direction to assist manipulation when turning.

It should be appreciated that the plate-like member may be rotatably secured to another plate-like member which is not turned when the first-mentioned plate-like member is turned to engage the projections with the slots.

The interrupted circular outline for the outer periphery of the plate-like member is preferably only slightly smaller in diameter than the interrupted circular outline for the inner periphery of the hollow member to increase the overall strength and thus further improve the resistance to release particularly in applications where there is a risk of attack.

BRIEF DESCRIPTION OF THE DRAWING

A fastening assembly, in accordance with both aspects of the present invention, will now be described in more detail, and by way of example only, with reference to the accompanying drawing, which is a perspective schematic view showing a plate-like member with ramped projections separated from a hollow member with slotted protrusions.

DETAILED DESCRIPTION OF A PREFERRED EMBODIMENT

In the accompanying drawing, a plate-like member 10 (constituting said first part) is integrally formed of a plastics material with a plurality of laterally extending projections in the form of arcuate sectors 12. A hollow member 14 is integrally formed of a plastics material to be of a generally cylindrical shape with a plurality of protrusions 16 (constituting said other parts) each of which is formed with a respective slot 18.

It should be noted that, in use, the plate-like member 10 is pushed into the hollow member 14 until the sectors 12 are positioned between the slots 18, whereupon the plate-like member 10 is turned to bring the sectors 12 into engagement with the slots 18.

Clearly, however, if more convenient, rather than moving the plate-like member 10 relatively to the hollow member 14, the hollow member 14 may be moved relatively to the plate-like member 10.

Each of the slots 18 is planar, that is to say is of uniform width considered in the axial direction of the hollow member 14, apart from at a respective locking rib 20.

In contrast, each of the sectors 12 is non-planar, that is to say is not of uniform width considered in the intended direction of insertion of the plate-like member 10 into the hollow member 14, but is formed as a ramp 22 of increasing thickness which at one end is thinner than a slot 18 and at the other end is thicker than a slot 18.

Each of the ramps 22 is provided with its own series of locking ribs 24 for "non-return" co-operation with respective ones of the above-noted locking ribs 20 when the ramps 22 are progressively turned into the slots 18 to give a strong wedging effect.

The plate-like member 10 further comprises: four legs 26 extending perpendicularly in one direction to limit insertion into the hollow member 14, two wings 28 extending perpendicularly in the opposite direction to assist turning relatively to the hollow member 14, a central aperture 30, various strengthening ribs 32 and a plurality of recesses 34, each of the recesses 34 being located between an adjacent pair of the sectors 12 with the result that the plate-like member 10 does not have an outer periphery of circular outline.

The recesses 34 are of complementary outline to the protrusions 16.

In the hollow member 14, each of the protrusions 16 is itself hollow, opens to the outer periphery of the hollow member 14 and extends axially of the hollow member 14 as a channel 36. The rest of the outer periphery of the hollow member 14 between the channels 36 is formed as a helical thread 38. One end of the hollow member 14 has a flange 40 carrying an orientation stud 42. The result of the protrusions 16 being located around the inner periphery of the hollow member 14 is that the hollow member 14 does not have an inner periphery of circular outline.

As already indicated, the interrupted circular outline for the outer periphery of the plate-like member 10 is preferably only slightly smaller in diameter than the interrupted circular outline for the inner periphery of the hollow member 14 to increase the overall strength after assembly has been achieved.

The plate-like member 10 may, in effect, be split along broken line 44 with the lower plate-like part, including the wings 28, being rotatably secured to the upper plate-like part, including the legs 26, which is not turned when the lower plate-like part is turned to engage the ramps 22 with the slots 18.

Various modifications will be readily apparent—for example, the legs 26 may be replaced by shoulders presented by the hollow member 14 to limit the intended insertion of the plate-like member 10 into the hollow member 14, the four sectors 12 may be replaced by two, six or some other plurality, and the central aperture 30 may be replaced by or utilised to provide access to or from a microswitch carried by the plate-like member 10.

What is claimed is:

1. A fastening assembly comprising:

a plate (10) provided with a plurality of laterally extending projections (12), and a hollow member (14) provided with a plurality of slots (18), the projections (12) being pushed into position between and then turned into engagement with respective ones of the slots (18);

wherein the slots (18) are formed in protrusions (16) around an inner periphery of otherwise circular outline of the hollow member (14), the projections (12) are formed as arcuate sectors located around the plate (10), the projections providing an outer periphery of circular outline other than at recesses (34) for receiving respectively the protrusions, (16) and at least one of the protrusions (16) is hollow, opens to an outer periphery of the hollow member (14), and extends axially of the hollow member (14).

2. A fastening assembly according to claim 1, wherein portions of the outer periphery of the hollow member (14) between the protrusions are threaded.

3. A fastening assembly according to claim 1, wherein the plate (10) includes a plurality of legs (26) extending perpendicularly in a first direction therefrom to act as abutments.

4. A fastening assembly according to claim, wherein the plate (10) includes a pair of wings (28) extending perpendicularly in a second direction therefrom to assist manipulation when turning.

5. A fastening assembly according to claim 1, wherein the plate (10) is rotatably secured to another plate member which is not turned when the first-mentioned plate member (10) is turned to engage the projections (12) with the slots (18).

6. A fastening assembly according to claim 1, wherein at least one of the projections (12) is formed as a ramp (22) of increasing thickness.

7. A fastening assembly according to claim 6, wherein at least one of the slots (18) is formed with a locking rib (20) for sequential engagement with a series of locking ribs (24) formed on at least one of the ramps (22).

8. A fastening assembly according to claim 3, wherein the legs (26) act as abutments for a component carried by the plate (10).

* * * * *